C. ROTHEN.
WATCHCASE.
APPLICATION FILED MAY 7, 1921.

1,399,322.

Patented Dec. 6, 1921.

INVENTOR
CHARLES ROTHEN,
By Arthur Middleton
atty.

UNITED STATES PATENT OFFICE.

CHARLES ROTHEN, OF GENEVA, SWITZERLAND.

WATCHCASE.

1,399,322.

Specification of Letters Patent.　　Patented Dec. 6, 1921.

Application filed May 7, 1921.　Serial No. 467,737.

(GRANTED UNDER THE PROVISIONS OF THE ACT OF MARCH 3, 1921, 41 STAT. L., 1313.)

*To all whom it may concern:*

Be it known that CHARLES ROTHEN, a citizen of the Republic of Switzerland, residing at Geneva, Switzerland, has invented certain new and useful Improvements in Watchcases, (for which I have filed a patent application in Switzerland on March 5th, 1920, Patent No. 88,223,) of which the following is a specification.

This invention relates to watch cases.

In the watch case of the present invention the back and rims are in one piece, the bezel for the glass has an external thread screwing into the rim portion and an internal bevel flange engaging the dust-sleeve, and turning freely. The dust-sleeve carries the stem tube which passes through the rim portion by a notch provided for this purpose.

In order more clearly to understand the invention, reference is made to the accompanying drawings which show by way of example one form of embodiment of the invention.

Figure 1:
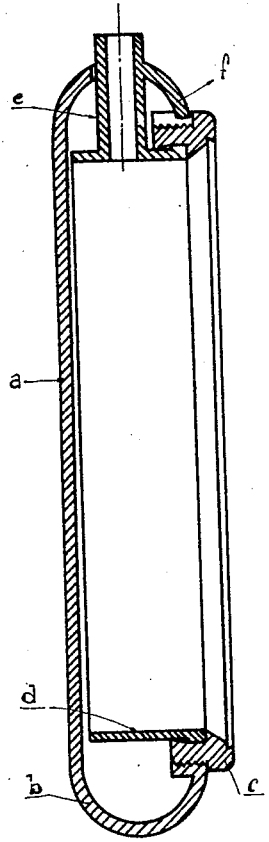
Figure 1 is a diametral section.
Figure 2:
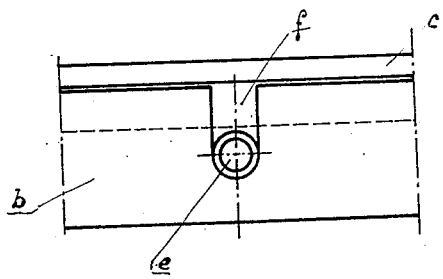
Fig. 2 is a partial plan from the stem side.

The bottom *a* and the rim portion *b* of the watch casing are in one piece. The glass bezel *c* screws on the rim portion *b* and is engaged by a bevel flange with the dust-sleeve *d* which carries the stem tube *e*, which tube passes through the rim portion *b* by a notch provided for this purpose, which in the present case is closed by a tongue *f* fixed on the stem tube *e*.

What I claim and desire to secure by Letters Patent of the United States is:

1. A watch casing comprising a bottom with the rim portion in one piece, a glass bezel screwing into said rim portion and engaging with a dust sleeve within said casing.

2. A watch casing comprising a bottom with the rim portion in one piece, a glass bezel screwing into said rim portion and engaging by means of a bevel flange with a dust sleeve within said casing.

3. A watch casing comprising a bottom with the rim portion in one piece, a glass bezel screwing into said rim portion and engaging with a dust sleeve within said casing, said dust sleeve carrying the stem tube passing through a notch provided in said rim portion.

4. A watch casing comprising a bottom with the rim portion in one piece, a glass bezel screwing into said rim portion and engaging by means of a bevel flange with a dust sleeve within said casing, said dust sleeve carrying the stem tube passing through a notch provided in said rim portion.

5. A watch casing comprising a bottom with the rim portion in one piece, a glass bezel screwing into said rim portion and engaging with a dust sleeve within said casing, said dust sleeve carrying the stem tube passing through a notch provided in said rim portion, and a tongue fixed on said stem tube closing said notch.

6. A watch casing comprising a bottom with the rim portion in one piece, a glass bezel screwing into said rim portion and engaging by means of a bevel flange with a dust sleeve within said casing, said dust sleeve carrying the stem tube passing through a notch provided in said rim portion and a tongue fixed on said stem tube closing said notch.

In testimony whereof I affix my signature.

CH. ROTHEN.